United States Patent
Hasegawa et al.

(10) Patent No.: US 7,108,633 B2
(45) Date of Patent: Sep. 19, 2006

(54) CONTROL APPARATUS FOR AUTOMATIC TRANSMISSION

(75) Inventors: Yoshio Hasegawa, Chiryu (JP); Tooru Matsubara, Susono (JP); Tadayuki Nagai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 191 days.

(21) Appl. No.: 10/947,298

(22) Filed: Sep. 23, 2004

(65) Prior Publication Data

US 2005/0064988 A1 Mar. 24, 2005

(30) Foreign Application Priority Data

Sep. 24, 2003 (JP) .............................. 2003-331446

(51) Int. Cl.
*B60W 10/02* (2006.01)
(52) U.S. Cl. ..................... 477/70; 192/220.1; 701/67
(58) Field of Classification Search ................ 477/174, 477/70, 180, 181, 71, 170, 114, 193; 701/67, 701/66, 70, 51, 52; 192/220, 221, 220.1, 192/219.1
See application file for complete search history.

(56) References Cited

U.S. PATENT DOCUMENTS

| | | | | |
|---|---|---|---|---|
| 4,644,826 | A * | 2/1987 | Kubo et al. ................... 477/95 |
| 5,692,990 | A * | 12/1997 | Tsukamoto et al. ........... 477/93 |
| 5,911,646 | A * | 6/1999 | Tsutsui et al. ................ 477/93 |
| 6,270,443 | B1 * | 8/2001 | Ito et al. ...................... 477/114 |
| 6,411,881 | B1 * | 6/2002 | Thomas ....................... 701/67 |
| 7,000,998 | B1 * | 2/2006 | Hano et al. ................. 303/191 |
| 2005/0020403 | A1 * | 1/2005 | Hasegawa et al. ............ 477/92 |

FOREIGN PATENT DOCUMENTS

| | | |
|---|---|---|
| DE | 197 28 484 A1 | 1/1998 |
| DE | 696 10 280 T2 | 1/2001 |
| JP | A-10-196782 | 7/1998 |
| JP | A-2003-156-143 | 5/2003 |
| JP | A-2003-156142 | 5/2003 |

* cited by examiner

*Primary Examiner*—Tisha Lewis
*Assistant Examiner*—Justin K. Holmes
(74) *Attorney, Agent, or Firm*—Oblon, Spivak, McClelland, Maier & Neustadt, P.C.

(57) ABSTRACT

In a control apparatus for an automatic transmission, a return control is executed to engage a clutch that has had its engagement pressure lowered and to disengage a brake so as to resume the state of the automatic transmission from the neutral state under a neutral control to the one where the forward speed is established. As the time for the neutral control becomes longer, the decrease in the torque of an output shaft of the automatic transmission becomes gentler. Accordingly an initial value of a control command value for the clutch pressure is decreased with the increase in the neutral control time such that the engagement of the clutch becomes gentler.

16 Claims, 10 Drawing Sheets

FIG. 2

| | C1 | C2 | C3 | C4 | B1 | B2 | B3 | B4 | F0 | F1 | F2 | F3 |
|---|---|---|---|---|---|---|---|---|---|---|---|---|
| Rev | | | O | | (O) | | | O | | O | | |
| N | | | | | | | | | | | | |
| N CONTROL | △ | | | (O) | (O) | O | | | | | | (O) |
| 1st | O | | | (O) | | | | | | | | O |
| 2nd | O | | | (O) | | | | (O) | | | O | |
| 3rd | O | | O | (O) | (O) | (O) | O | | O | O | | |
| 4th | O | O | ● | (O) | | | ● | | O | | | |
| 5th | ● | O | O | | O | | ● | | O | O | | |
| 6th | ● | O | | | ● | O | ● | | O | | | |

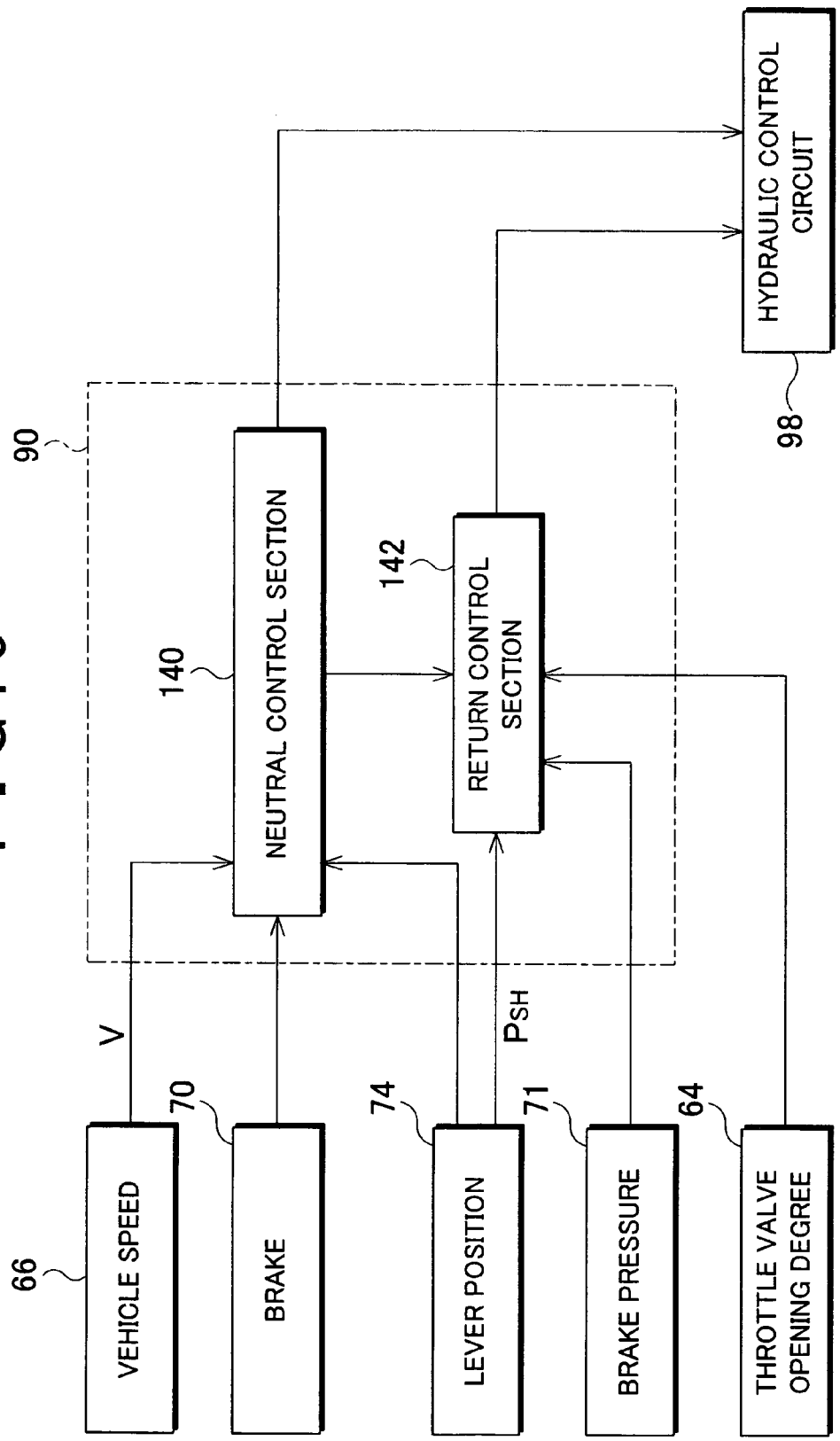

CONTROL APPARATUS FOR AUTOMATIC TRANSMISSION

INCORPORATION BY REFERENCE

The disclosure of Japanese Patent Application No. 2003-331446 filed on Sep. 24, 2003, including the specification, drawings and abstract are incorporated herein by reference in its entirety.

BACKGROUND OF THE INVENTION

1. Field of Invention

The invention relates to a control apparatus for an automatic transmission of a vehicle, and more particularly to a neutral control for decreasing an engagement pressure of a neutral control clutch of the automatic transmission, which performs connection and disconnection between the automatic transmission and an engine of the vehicle when the vehicle stops in a state where the forward running range is selected.

2. Description of Related Art

It has been well known that a control apparatus for controlling an automatic transmission in a vehicle reduces an engagement pressure of the clutch for neutral control of the automatic transmission, which clutch performs connection and disconnection between the automatic transmission and the engine, that is, a neutral control when the vehicle stops in the forward running range, for the purpose of improving the fuel efficiency (disclosed in the publication, for example, JP-A-10-196782).

As the engagement pressure of the neutral control clutch is decreased, the road wheels are brought into a freely rotatable state. Accordingly the control apparatus disclosed in the aforementioned publication JP-A-10-196782 engages a hill-holding engagement element that inhibits counter rotation of an output shaft of the automatic transmission so as to prevent the vehicle from moving backward on the up-hill, and executes the neutral control for reducing the engagement pressure of the neutral control clutch.

When the automatic transmission is returned to the state where the forward drive is established upon completion of the neutral control, the engagement pressure of the neutral control clutch is returned to the original state, and the hill-holding engagement element is disengaged. In this case, an appropriate correlation between the timing at which the neutral control clutch is engaged and the timing at which the hill-holding engagement element is disengaged has to be maintained. If the engagement of the neutral control clutch is completed at relatively earlier stage with respect to the timing at which the hill-holding engagement element is disengaged, re-engagement of the neutral control clutch may cause a certain shock. Meanwhile, if the hill-holding engagement element is disengaged at relatively earlier stage with respect to the timing at which the neutral control clutch is engaged, the vehicle stopped on the up-hill may be moved backward momentarily.

When there is a variation in the friction coefficients of individual neutral control clutches, or a change in the friction coefficient owing to passage of time, the time taken for engaging the neutral control clutch may vary even if the engagement pressure is controlled in the same way as described above. In the control apparatus disclosed in the publication JP-A-10-196782, a gradient of increase in the engagement pressure is set by learning such that the neutral control clutch can be engaged for a predetermined time irrespective of the variation of the friction coefficients in individual neutral control clutches, change in the friction coefficient owing to passage of time, and the like.

The publications, each of which is considered as being relevant to the invention, will be listed as below:
(1) JP-A-10-196782,
(2) JP-A-2003-156142, and
(3) JP-A-2003-156143.

Even if each of the neutral control clutches is controlled to be engaged for a predetermined time, the neutral control clutch is engaged at relatively earlier stage or the hill-holding engagement element is disengaged at relatively earlier stage, depending on the time for implementing the neutral control. As a result, when the automatic transmission returns from the neutral state to the one where the forward drive is established, a certain shock may occur. This may also move the vehicle stopped on the up-hill backward momentarily.

SUMMARY OF THE INVENTION

It is an object of the invention to provide a control apparatus for an automatic transmission, which reduces the shock caused when the automatic transmission returns from the neutral state and allows the vehicle to smoothly take off irrespective of the time for executing the neutral control.

After considerations to realize the object of the invention, it has been found that the change in the torque of the output shaft of the automatic transmission upon rise-up of the engagement pressure of the neutral control clutch may vary depending on the time for executing the neutral control in spite of the same control of the engagement pressure. The invention has been made based on the aforementioned knowledge.

According to the invention, a control apparatus for an automatic transmission includes a neutral control unit that decreases an engagement pressure of a neutral control clutch provided in the automatic transmission and serving to control a connection between the automatic transmission and an engine of a vehicle, and engages a hill-holding engagement element that prevents the vehicle from moving backward by inhibiting a counter rotation of an output shaft of the automatic transmission when the vehicle is stopped in a state where a forward range is selected; and a return control unit that engages the neutral control clutch by changing a hydraulic command value for the neutral control clutch based on a predetermined pattern, and disengages the hill-holding engagement element by changing a hydraulic command value for the hill-holding engagement element based on a predetermined pattern when a predetermined neutral return control condition is established. In the control apparatus, the return control unit changes an engagement control for the neutral control clutch in accordance with a time of a control executed by the neutral control unit.

In the control apparatus, the return control unit determines a decrease correction value of the engagement pressure of the neutral control clutch using a predetermined relation in which the decrease correction value is increased as the time of the control executed by the neutral control unit becomes longer, and decreases the predetermined hydraulic command value for the neutral control clutch, based on the determined decrease correction value such that the neutral control clutch is gently engaged.

In the control apparatus, in an opening state of the throttle valve, the return control unit determines a first increase correction value using a predetermined relation in which the first increase correction value is increased as the time of control executed by the neutral control unit becomes longer, and further corrects the hydraulic command value of the neutral control clutch that has been corrected with the decrease correction value based on the determined first increase correction value.

In the control apparatus, a second increase correction value is determined with a predetermined relation in which the second increase correction value is increased as an opening degree of the throttle valve becomes larger, and the hydraulic command value for the neutral control clutch that has been corrected with the decrease correction value is further corrected based on the determined second increase correction value and the first increase correction value.

In the control apparatus, the return control unit changes a start timing for changing the hydraulic command value of the hill-holding engagement element in accordance with the time of the control executed by the neutral control unit.

Based on the knowledge that the change in the torque of the output shaft of the automatic transmission upon rise-up of the engagement pressure of the neutral control clutch varies depending on the neutral control time, the present invention is structured such that the engagement control of the neutral control clutch is changed in accordance with the neutral control time, that is the time interval during which neutral control has been established. As a result, this may reduce the shock caused when the automatic transmission returns from the neutral state, and the vehicle to take off smoothly.

According to the invention, the return control unit serves to make the engagement of the neutral control clutch more gentle by the correction that decreases a predetermined hydraulic command value for the neutral control clutch, resulting in the same effects as described above.

According to the invention, the first increase correction value is increased as the neutral control time becomes longer in an opening state of the throttle valve. Then the hydraulic command value for the neutral control clutch that has been corrected to be decreased as described above is further corrected to be increased based on the first increase correction value. As a result, this may offset the decrease correction value partially or entirely. Accordingly the engagement pressure of the neutral control clutch starts rising at an earlier stage such that the timing at which the engagement of the neutral control clutch is completed may be advanced to cope with the rapid rise-up in the engine torque.

According to the invention, the second increase correction value is increased as the throttle opening degree becomes large. Then the hydraulic command value for the neutral control clutch that has been corrected to be decreased as aforementioned is further corrected to be increased based on both the second and the first increase correction values. The timing at which the engagement of the neutral control clutch is completed may further be adjusted to cope with the rapid rise-up in the engine torque.

According to the invention, the return control unit serves to change the timing for starting the change in the hydraulic command value for the hill-holding engagement element. This makes it possible to appropriately maintain the correlation between the timing at which the hill-holding engagement element is disengaged and the timing at which the neutral control clutch is engaged even if the engagement control for the neutral control is changed in accordance with the neutral control time. This may allow the vehicle to smoothly take off.

BRIEF DESCRIPTION OF THE DRAWINGS

FIG. 2 is a graph showing a combination of operations of a plurality of hydraulic friction engagement units and shift stage established thereby;

FIG. 5 is a block diagram representing an essential portion of the function of an electronic control unit shown in FIG. 3;

DETAILED DESCRIPTION OF PREFERRED EMBODIMENTS

Figure 1:
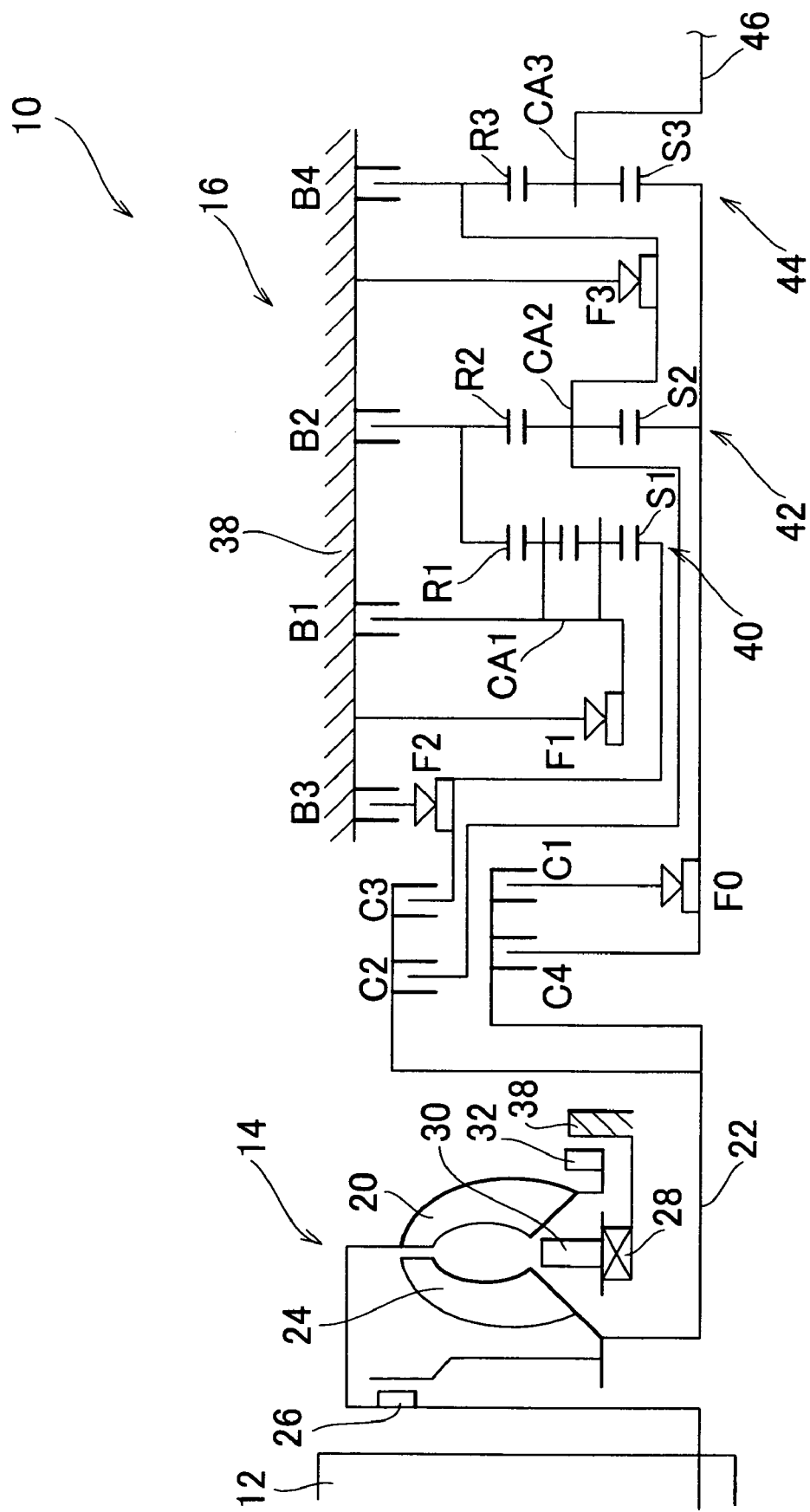
FIG. 1 is a schematic view that shows a structure of a drive unit for a vehicle to which the invention is applied.

An embodiment of the invention will be described referring to the drawings.

FIG. 1 is a schematic diagram showing a structure of a drive unit 10 for a vehicle, to which the invention is applied. Referring to FIG. 1, an output of an engine 12 structured as an internal combustion engine that serves as a running drive source is input to an automatic transmission 16 via a torque converter 14 serving as a hydraulic power transmission device, and further transmitted to a drive shaft via a differential gear unit and an axle (not shown). The torque converter 14 includes a pump impeller 20 connected to the engine 12, a turbine impeller 24 connected to an input shaft 22 of the automatic transmission 16, and a stator impeller 30 with its rotating direction limited to one direction by a one-way clutch 28. The torque converter 14 performs power transmission between the pump impeller 20 and the turbine impeller 24, and further includes a lock-up clutch 26 for a direct connection between the pump impeller 20 and the turbine impeller 24. The pump impeller 20 is provided with a mechanically operated oil pump 32 that generates a hydraulic pressure for a shift control of the automatic transmission 16 or supply of lubricating oil to various parts.

The automatic transmission 16 is of a planetary gear type, and includes a first planetary gear unit 40 of double pinion type, and second and third planetary gear units 42, 44 each of single pinion type. A sun gear S1 of the first planetary gear unit 40 is selectively connected to an input shaft 22 via a clutch C3, and to a housing 38 via a one-way clutch F2 and a brake B3 such that a counter rotation (rotating direction reverse to that of the input shaft 22) is prevented. A carrier CA1 of the first planetary gear unit 40 is selectively connected to the housing 38 via a brake B1. The reverse rotation of the carrier CA1 is prevented by a one-way clutch F1 provided in parallel with the brake B1. A ring gear R1 of the first planetary gear unit 40 is integrally connected to a ring gear R2 of the second planetary gear unit 42, and is selectively connected to the housing 38 via a brake B2. A sun gear S2 of the second planetary gear unit 42 is integrally connected to a sun gear S3 of the third planetary gear unit 44, and selectively connected to the input shaft 22 via clutch C4, and selectively connected to the input shaft 22 via a one-way clutch F0 and a clutch C1, so as to be prevented from rotating in reverse with respect to the input shaft 22. A carrier CA2 of the second planetary gear unit 42 is integrally connected to a ring gear R3 of the third planetary gear unit 44, and selectively connected to the input shaft 22 via the clutch C2, and selectively connected to the housing 38 via a brake B4, and is prevented from rotating in reverse by the one-way clutch F3 provided in parallel with the brake B4. A carrier CA3 of the third planetary gear unit 44 is integrally connected to an output shaft 46.

Each of the aforementioned clutches C1 to C4 and brakes B1 to B4 (hereinafter generally referred to as a clutch C and a brake B, if they are not distinguished among them) constitutes a hydraulic friction engagement unit that is operated under the control of a hydraulic actuator such as a multi plate disk clutch or a brake. A hydraulic circuit is selected by excitation or non-excitation to solenoid valves Sol1 to Sol5 and linear solenoid valves SL1, SL2 of a hydraulic control circuit 98 (see FIG. 3), or by operating a manual valve (not shown) such that an engagement or disengagement state is selected as shown in FIG. 2, for example, and six forward stages (1st to 6th speeds) and one reverse stage (Rev are established depending on the operation position of a shift lever 72 (see FIG. 3). The terms "1st" to "6th" in the table shown in FIG. 2 represent the first shift speed to the sixth shift speed, respectively. As the shift speed is changed from the 1st to the 6th stage, the speed ratio (rotating speed Nin of the input shaft 22 Nin/rotating speed Nout of the output shaft 46) becomes smaller. The speed ratio of the 4rth stage may become 1.0. Referring to the table in FIG. 2, the code - -○- - represents an engaged state, the blank represents a disengaged state. The code - -(○) - - represents an engaged state when an engine braking force is applied. The code - -●- - represents the engagement that is not related to the power transmission.

The term "N control" in the graph of FIG. 2 represents an engaged state under the neutral control executed when the vehicle is stopped in the forward range such as a range D, and a predetermined condition is established, for example, depression of a foot brake. The code - -Δ- - represents a half-engaged state at a reduced engagement pressure. That is, under the neutral control, the clutch C1 for the neutral control is brought into the half-engaged state, and the brake B2 as a hill-holding engagement element is brought into the engagement state. The code - -(○)- - corresponding to the one-way clutch F3 represents the engaged state during hill-holding.

The hydraulic control circuit 98 includes a linear solenoid valve SLU for mainly controlling a lock-up hydraulic pressure, and a linear solenoid valve SLT for mainly controlling a line hydraulic pressure in addition to the solenoid valves Sol1 to Sol5 for shifting operations, and the linear solenoid valves SL1, SL2 for shifting operations. The hydraulic oil within the hydraulic control circuit 98 is supplied to the lock-up clutch 26 and used for lubricating the automatic transmission 16 and other portions.

Figure 3:
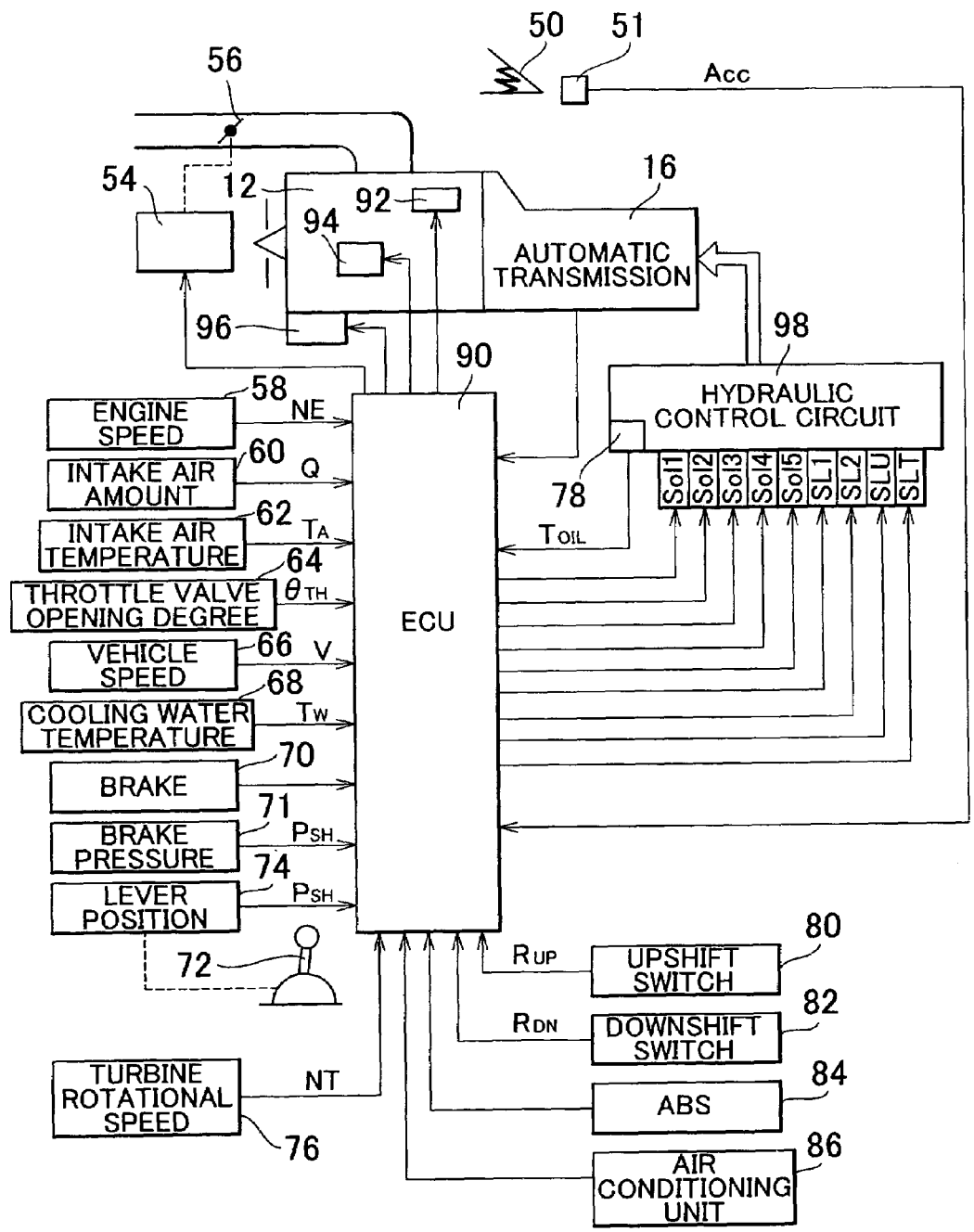
FIG. 3 is a block diagram representing an essential portion of a control system in the drive unit of the vehicle shown in FIG. 1.

FIG. 3 is a block diagram representing a control system provided in the vehicle for controlling the engine 12, the automatic transmission 16 and the like as shown in FIG. 1, and an operation amount Acc of an accelerator pedal 50 is detected by an accelerator operation amount sensor 51. An intake pipe of the engine 12 is provided with an electronic throttle valve 56 that is opened by a throttle actuator 54 at an angle θ (opening degree) corresponding to the operation amount Acc of the accelerator pedal. It is further provided with an engine speed sensor 58 for detecting an engine speed NE of the engine 12, an intake air amount sensor 60 for detecting an intake air amount Q of the engine 12, an intake air temperature sensor 62 for detecting a temperature $T_A$ of the intake air, a throttle sensor 64 with an idling switch for detecting a fully closed state (idling state) of the electronic throttle valve 56 and an opening degree θ thereof, a vehicle speed sensor 66 for detecting a vehicle speed V (corresponding to a rotating speed Nout of the output shaft 46), a cooling water temperature sensor 68 for detecting a cooling water temperature $T_W$ of the engine 12, a brake switch 70 for detecting a presence/absence of operation of the foot brake as the regular brake, a brake pressure sensor 71 for detecting a braking pressure applied to the vehicle upon operation of the foot brake, a lever position sensor 74 for detecting a lever position (operation position) $P_{SH}$ of a shift lever 72, a turbine rotating speed sensor 76 for detecting a turbine rotating speed NT (=rotating speed Nin of the input shaft 22), an AT oil temperature sensor 78 for detecting an AT oil temperature $T_{OIL}$ as a temperature of a hydraulic oil within the hydraulic control circuit 98, an upshift switch 80 and a downshift switch 82. An electronic control unit 90 (hereinafter referred to as ECU) receives signals indicating the engine speed NE, intake air amount Q, intake air temperature $T_A$, throttle valve opening degree θ, vehicle speed V, engine cooling water temperature $T_W$, presence/absence of braking operation, braking force applied to the vehicle, the lever position $P_{SH}$ of the shift lever 72, the turbine rotating speed NT, AT oil temperature $T_{OIL}$, up command $R_{UP}$ for the shift range, down command $R_{DN}$ for the shift range, and the like from the aforementioned sensors and switches, the ECU 90 is further connected to an ABS (Anti-lock Braking System) 84 for controlling the braking force such that the wheel is not locked (slipped) during operation of the foot brake, the ECU 90 receives the information relating to the braking oil pressure corresponding to the braking force as well as the signal indicating presence/absence of the operation of an air conditioning unit 86.

The ECU 90 includes a microcomputer having CPU, RAM, ROM, input/output interface and the like. The CPU serves to process signals according to the program preliminarily stored in the ROM while using a temporary data storage function of the RAM such that the output control of the engine 12 or shift control of the automatic transmission 16 are executed. The ECU 90 may be divided into sections for an engine operation control, shift control, and braking control, respectively when required.

Figure 4:
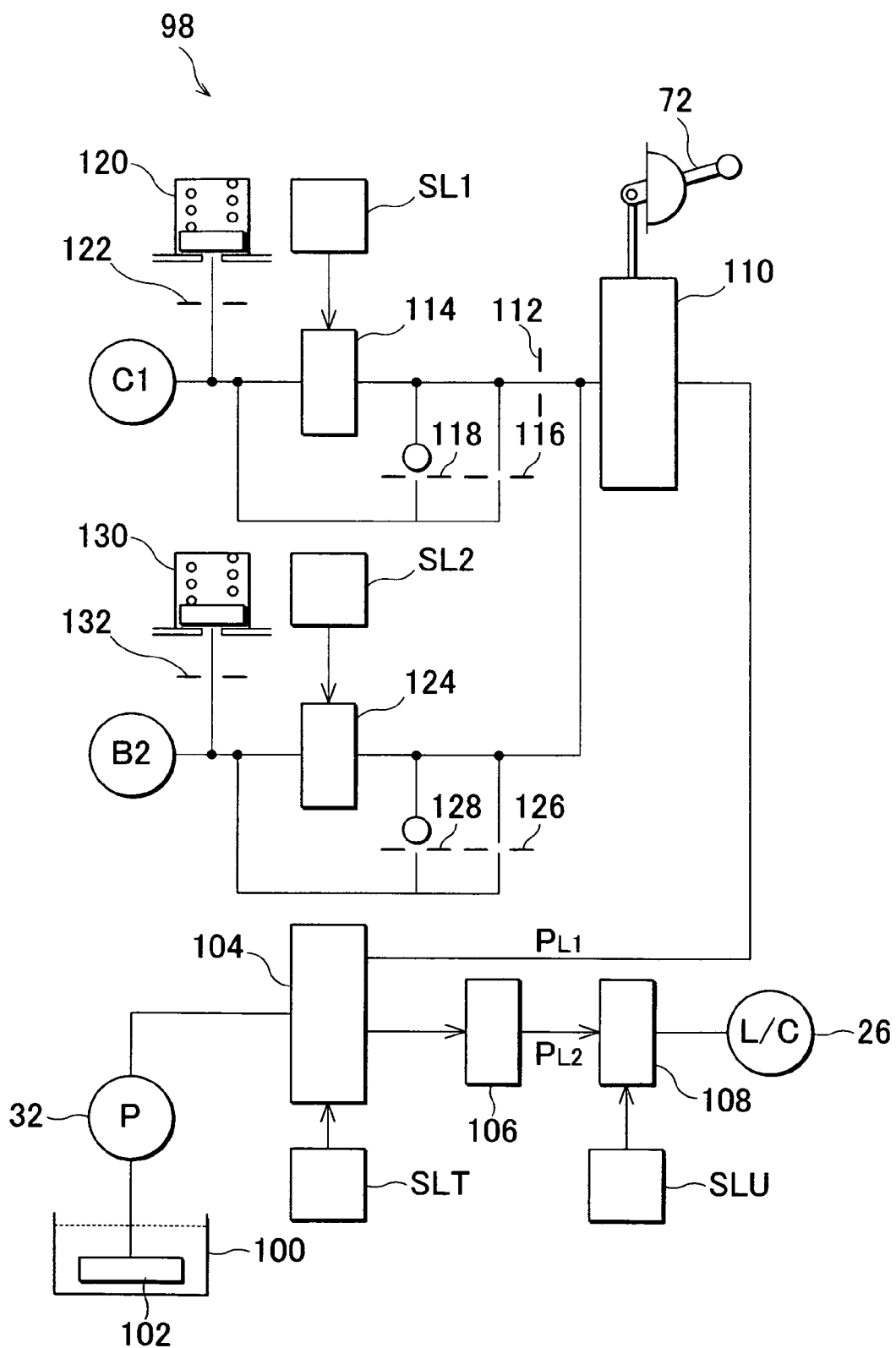
FIG. 4 is a view representing an essential portion of the hydraulic control circuit that controls operations of the lock-up clutch of the torque converter or the automatic transmission shown in FIG. 1.

FIG. 4 is a schematic view that shows an essential portion of the hydraulic control circuit 98 that controls operations of the lock-up clutch 26 in the torque converter 14 or the automatic transmission 16. Referring to FIG. 4, an oil pump 32 takes the hydraulic oil refluxed in an oil pan 100 serving as an oil tank via a strainer 102, and supplies the hydraulic oil to a first pressure regulating valve 104 of relief type under pressure. The first pressure regulating valve 104 regulates a first line pressure $P_{L1}$ to be corresponded to the input torque of the automatic transmission 16 in accordance with the oil pressure signal indicating the throttle valve opening from the linear solenoid valve SLT under the control of the ECU 90. As the first line pressure $P_{L1}$ serves as a hydraulic pressure source of the hydraulic friction engaging units such as the clutch C and brake B, it is regulated to the pressure as low as possible so long as no slippage occurs in the hydraulic friction engaging unit. A second pressure regulating valve 106 regulates a second line pressure $P_{L2}$ using pressure of the hydraulic oil supplied from the first pressure regulating valve 104. A lock-up control valve 108 outputs the hydraulic pressure using the second line pressure $P_{L2}$ such that the lock-up clutch 26 is brought into the engaged state, disengaged state or slip state in accordance with the hydraulic signal from the linear solenoid valve SLU under the control of the ECU 90.

A manual valve 110 to which the first line pressure $P_{L1}$ is supplied is mechanically connected to the shift lever 72 serving as a shift operation unit. A selector position of the manual valve 110 is changed in response to the operation position of the shift lever 72 including positions P, R, N, D, S, and L, for example. The first line pressure $P_{L1}$ is output to the clutch C and the brake B from the port corresponding to the selector position.

Provided between the clutch C1 and the manual valve 110 is an oil passage for engaging the clutch C1 quickly upon an automatic return from the stopped state of the engine 12 or a return from the neutral control. More specifically, in a fast apply (fast oil supply) state, the first line pressure $P_{L1}$ is supplied from the manual valve 110 to the clutch C1 via a control valve 114 that is operated by a large diameter orifice 112 and a linear solenoid SL1. Meanwhile in a non-fast apply state (normal oil supply), the first line pressure $P_{L1}$ is supplied from the manual valve 110 to the clutch C1 via the large diameter orifice 112 and a small diameter orifice 116. A check valve 118 arranged in parallel with the small-diameter orifice 116 is closed when the first line pressure $P_{L1}$ is supplied to the clutch C1. The check valve 118 is opened when the hydraulic oil is discharged from the clutch C1, thus disengaging the clutch C1. The clutch C1 can be smoothly engaged by a C1 accumulator 120 connected thereto and an orifice 122 provided on a path connected thereto.

Provided between the brake B2 and the manual valve 110 are two oil passages, one for the fast oil supply and the other for the normal oil supply. In the fast apply (fast oil supply) state, the first line pressure $P_{L1}$ is supplied from the manual valve 110 to the brake B2 via a control valve 124 that is operated by the linear solenoid SL2. In the non-fast apply (normal oil supply) state, the first line pressure $P_{L1}$ is supplied from the manual valve 110 to the brake B2 via the small-diameter orifice 126. The oil passage between the brake B2 and the manual valve 110 is provided with a check valve 128, a B2 accumulator 130, and an orifice 132 each functioning in the same way as for the clutch C1.

FIG. 5 is a block diagram that represents an essential portion of a control section of the ECU 90. The ECU 90 includes a neutral control section 140 and a return control section 142.

The neutral control section 140 determines whether a predetermined neutral control start condition (for example, the shift lever 72 is set to the position in the forward range, the vehicle speed V is substantially zero, and the state where the foot brake is operated is continued for a predetermined period, about several seconds, for example) has been established based on detection signals from the lever position sensor 74, the vehicle speed sensor 66 and the brake switch 70. If it is determined that the condition has been established, the neutral control section 140 outputs a control signal to the hydraulic control circuit 98 to decrease an engagement pressure of the clutch C1 so as to be brought into a half-engaged state as well as to engage the brake B2.

The return control section 142 determines a return timing from the neutral control based on detection signals from the lever position sensor 74, brake pressure sensor 71, and the throttle sensor 64. Upon determining the return timing from the neutral control, the return control section 142 outputs a control signal to the hydraulic control circuit 98 to switch the neutral state of the automatic transmission 16 under the neutral control section 140 to the state in which one of the forward speeds, for example the first speed, is established.

When the neutral state of the automatic transmission 16 is switched to the state in which one of the forward speeds is established, the return control section 142 changes the control command value for the clutch C1 pressure (hydraulic command value) and the control command value for the brake B2 pressure in accordance with predetermined patterns. The clutch C1, thus, is engaged again, and the brake B2 is disengaged. As the time period for executing the neutral control, that is, the time interval during which neutral control has been executed, becomes longer, the torque of the output shaft in the automatic transmission held by the brake B2 under the neutral control becomes lower. The pattern of the control command value for the C1 pressure is thus changeable in accordance with the neutral control time executed by the neutral control section 140 such that no shock is caused by the engagement of the clutch C1 in spite of reduction in the torque of the output shaft in the automatic transmission. It may be set such that the increase in the C1 pressure becomes gentler as the neutral control time becomes longer by changing the initial value, the rise-up speed (gradient) from the initial value and the like. As the rise-up in the pressure of the clutch C1 becomes more gentle, the timing at which the clutch C1 starts holding the torque capacity is delayed, therefore the pattern of the control command value for the B2 pressure is also changeable in response to the change in the control command value for the C1 pressure such that the vehicle smoothly takes off. That is, the control command value for the B2 pressure is set such that the timing at which the reduction starts is delayed as the neutral control time becomes longer.

Figure 6A:
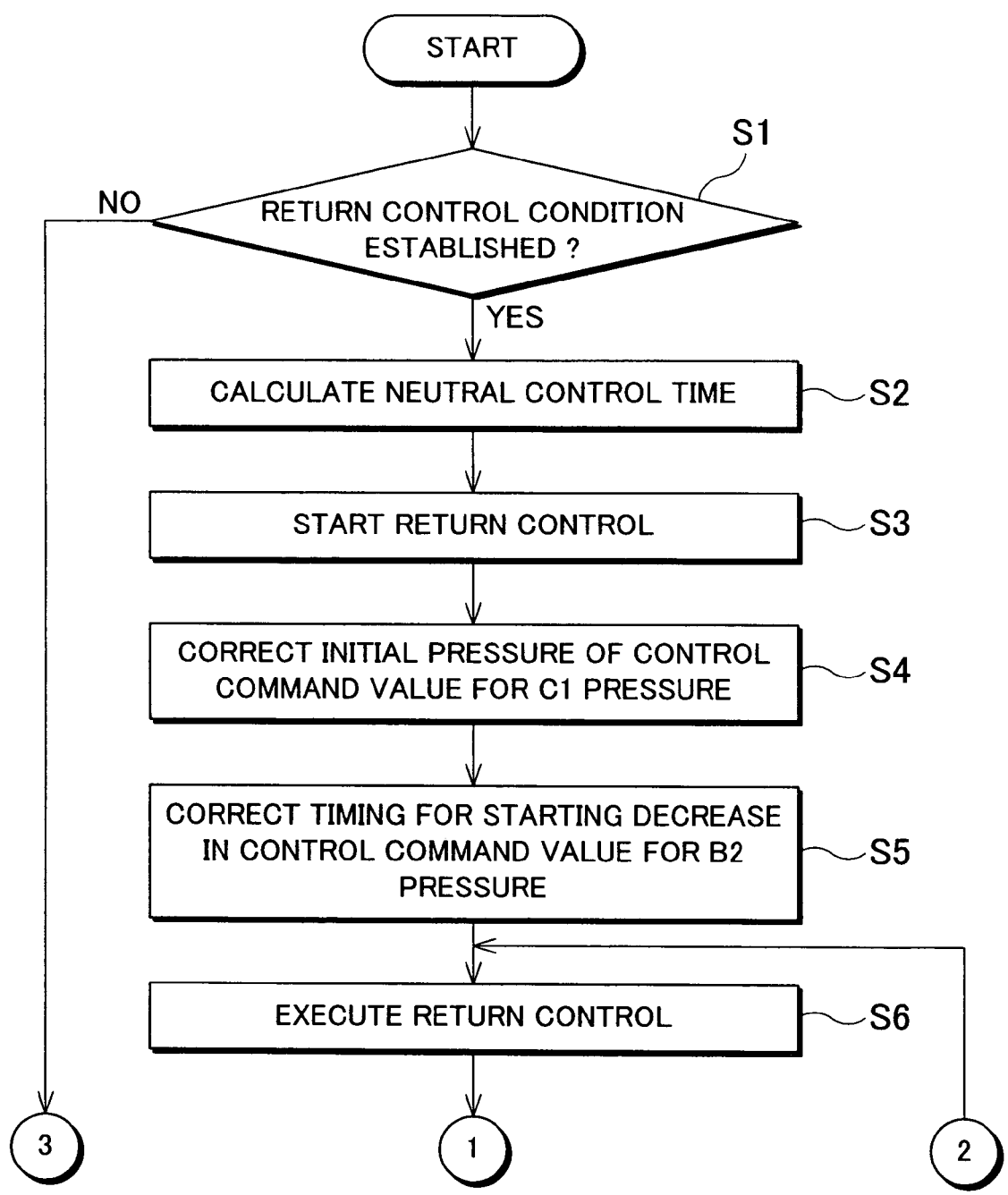
FIG. 6 is a flowchart representing a control routine executed by a neutral return control section shown in FIG. 5.
Figure 6B:
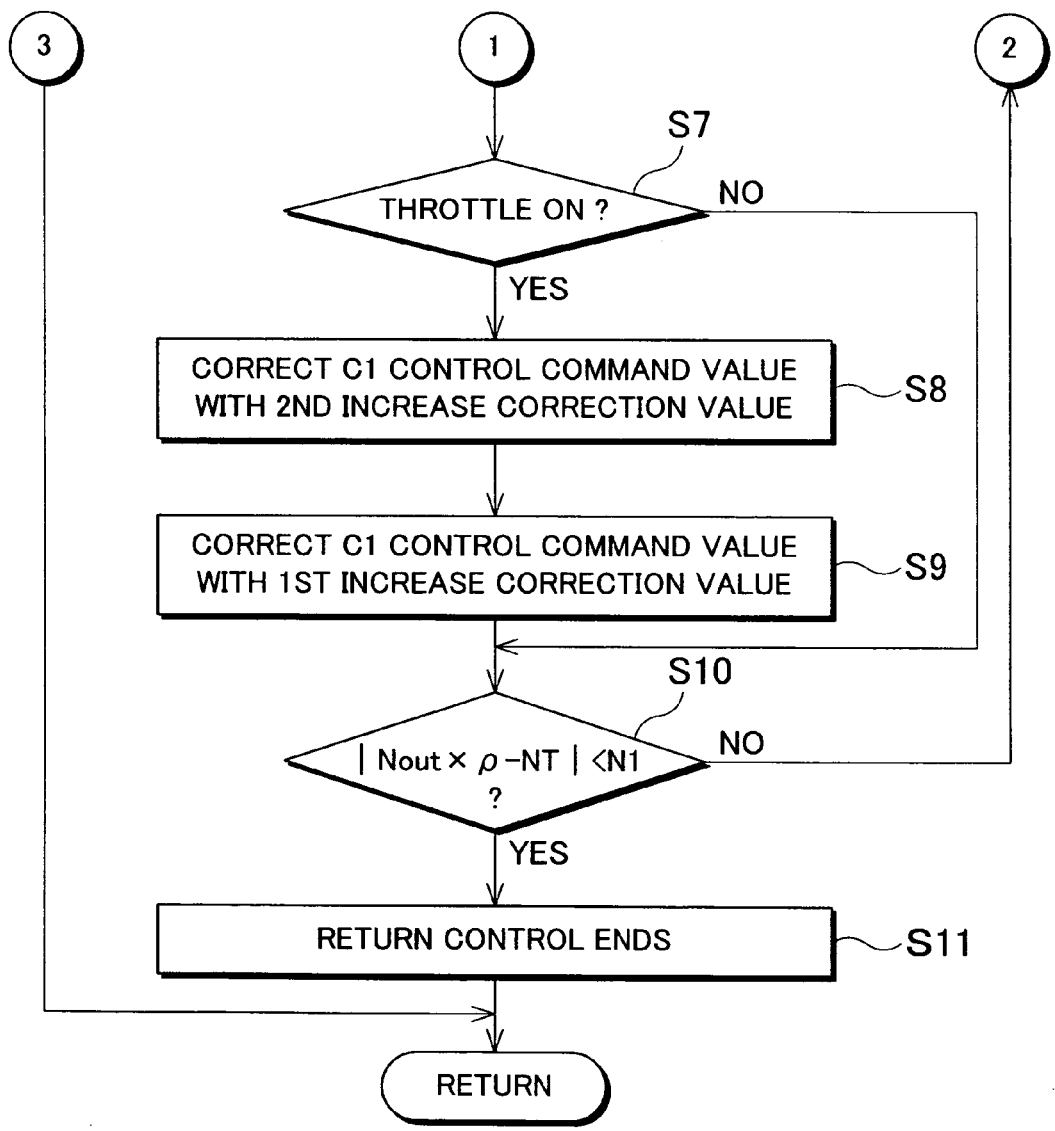

FIG. 6 is a flowchart representing a concrete control routine executed by the return control section 142. The control routine is executed for the period while the neutral control is executed by the neutral control section 140, that is, after the automatic transmission 16 is brought into a neutral state by the neutral control section 140.

First in step S1 (the "step" will be hereinafter skipped), it is determined whether a predetermined return condition has been established. The return condition may include the case in which the vehicle braking pressure detected by the brake pressure sensor 71 is smaller than a set value, the amount of change in the vehicle braking pressure is larger than the set value, the throttle valve opening degree θ detected by the throttle sensor 64 is larger than the set value, the component failure is detected, for example, the solenoid is determined as having a failure, the time taken for the neutral control becomes longer than the set value, or the shift lever 72 is operated. At least one of the aforementioned cases occurs, it is determined that the neutral control return condition is established.

If NO is obtained in S1, the process returns and the determination as aforementioned is made in S1 again. If YES is obtained in S1, the process proceeds to S2 where the time elapsing from the start of the neutral control is calculated, and starts the return control in S3. The return control is executed by performing the process in S4 and the subsequent steps.

In S4, a decrease correction amount is determined using a first correction relation that is preliminarily set such that the decrease correction amount is increased as the neutral control time becomes longer. Based on the determined decrease correction value, the preliminarily set initial value of the C1 pressure control command value is decreased. According to an example of a first correction relation shown in FIG. 7, the decrease correction amount is linearly increased in proportion to the increase in the neutral control time. However, such relation is not limited to the one shown in FIG. 7. The decrease correction amount may be increased exponentially or quadratic functionally as the increase in the neutral control time.

Figure 8:
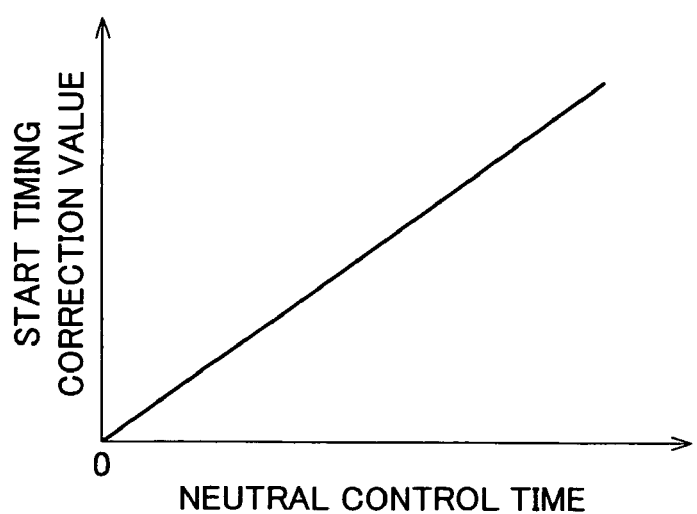
FIG. 8 is a view showing an example of a second correction relation used in S5 of the flowchart shown in FIG. 6.

Then in S5, the start timing correction amount is determined using a preliminarily set second correction relation such that the start timing correction amount becomes large as the neutral control time is longer. Based on the determined start timing correction amount, the start timing for reducing the preliminarily set B2 pressure control command value is delayed. According to an example of the second correction relation shown in FIG. 8, the start timing correction amount is linearly increased in proportion to the increase in the neutral control time. The relation is not limited to the one shown in FIG. 8, but the appropriate relation may be experimentally determined.

Next in S6, the C1 pressure control command value and the B2 pressure control command value are output to the hydraulic control circuit 98 in accordance with the pattern determined in S4 to S5 so as to execute the return control where the clutch C1 is engaged again and the brake B2 is disengaged.

In S7, it is determined whether the throttle valve 56 is opened based on the signal from the throttle sensor 64. As operations of the throttle valve 56 correspond to the operation amount of the accelerator pedal Acc, such determination can be made based on the signal from the accelerator operation amount sensor 51. If NO is obtained in S7, the process proceeds to S10. If YES is obtained in S7, the process proceeds to S8 and S9.

Figure 9:
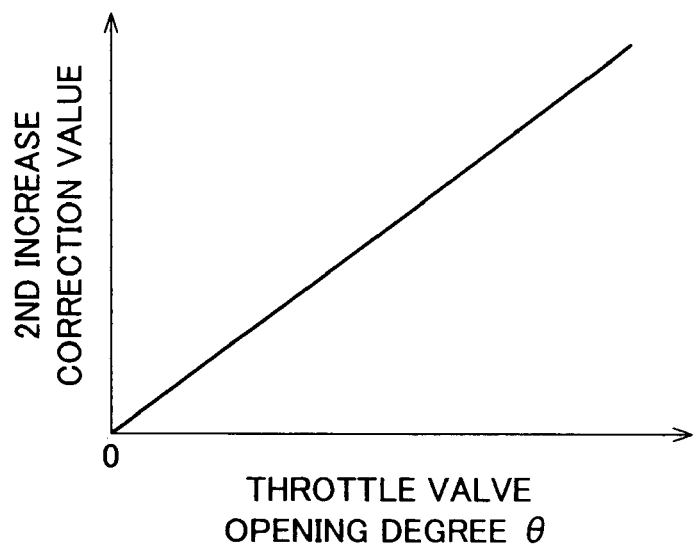
FIG. 9 is a view showing an example of a third correction relation used in S8 of the flowchart shown in FIG. 6.

In S8, the opening degree θ of the throttle valve is detected, and a second increase correction amount is determined using a predetermined third correction relation in which the second increase correction value increases as the opening degree θ of the throttle valve becomes large. The determined second increase correction value is added to the C1 pressure control command value at that time. The timing for engaging the clutch C1 is advanced by correcting the C1 pressure control command value in S8. Referring to FIG. 9 showing an example of the third correction relation, the second increase correction value is linearly increased in proportion to the increase in the opening degree of the throttle valve. The third correction relation is not limited to the example shown in FIG. 9, but may be set such that the second increase correction value increases exponentially or quadric functionally.

Figure 7:
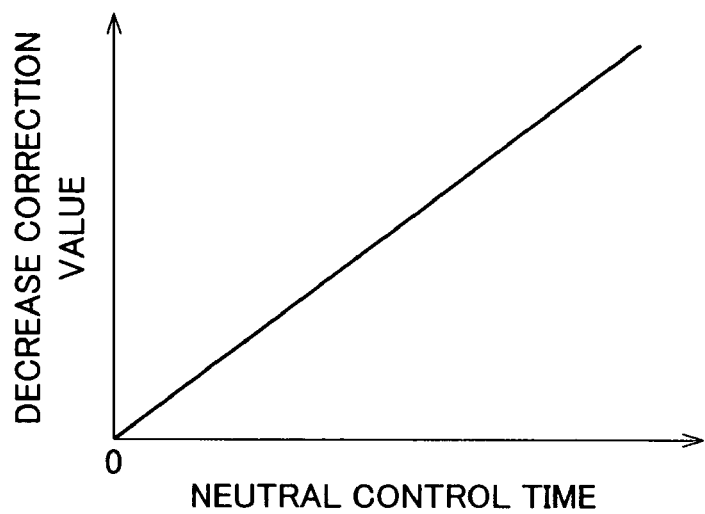
FIG. 7 is a view showing an example of a first correction relation used in S4 of the flowchart shown in FIG. 6.
Figure 10:
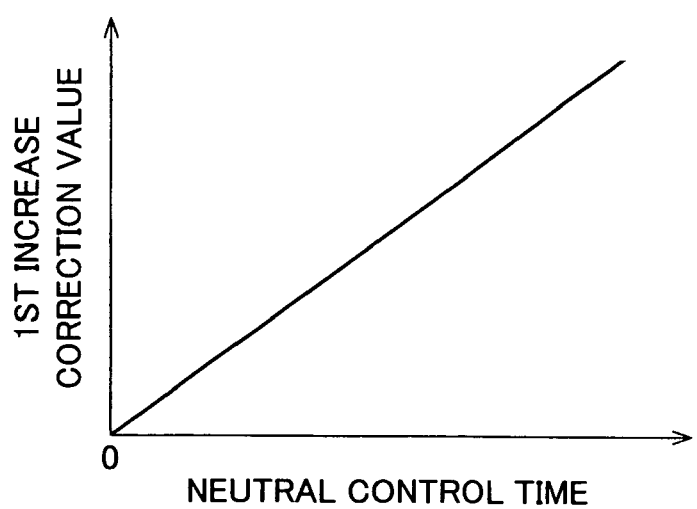
FIG. 10 is a view showing an example of a fourth correction relation used in S9 of the flowchart shown in FIG. 6.

In S9, a first increase correction value is determined using a predetermined fourth correction relation in which the first increase correction value increases as the neutral control time becomes long. The determined first increase correction value is added to the C1 pressure control command value at that time. Referring to FIG. 10 showing an example of the fourth correction relation, the first increase correction value is linearly increased in proportion to the increase in the neutral control time. Accordingly the decrease correction value is partially or entirely offset by correcting the C1 pressure control command value in S9. As a result, the timing for engaging the clutch C1 may be advanced. In this embodiment, the fourth correction relation for determining the first increase correction value as shown in FIG. 10, and the first correction relation for determining the decrease correction value as shown in FIG. 7 are linearly represented. However, each of absolute values of the first increase correction value and the decrease correction value may be the same but does not have to be necessarily the same. The fourth correction relation may be exponentially or quadradic functionally set in the same way as the first correction relation. S8 and S9 are executed to perform correction for advancing the re-engagement timing of the clutch C1 so as to cope with early rise-up in the engine torque resulting from depression of the accelerator pedal 50. Therefore at least one of S8 and S9 may be executed, or both of them may be executed, or neither of them may be executed.

If NO is obtained in S7, or S9 is executed, the process proceeds to S10 where it is determined whether the absolute value of the difference between the product of the rotational speed Nout of the output shaft 46 and the gear ratio ? of the automatic transmission 16, and the rotational speed NT of the turbine, that is |Nout×?−NT|, is smaller than a synchronous reference value N1 set at a relatively small value that is close to zero.

If NO is obtained in S10, the process proceeds to S6 and subsequent steps to be executed repeatedly so as to continue the return control from the neutral state. If YES is obtained in S10, the process proceeds to S11 where the return control ends.

Figure 11:
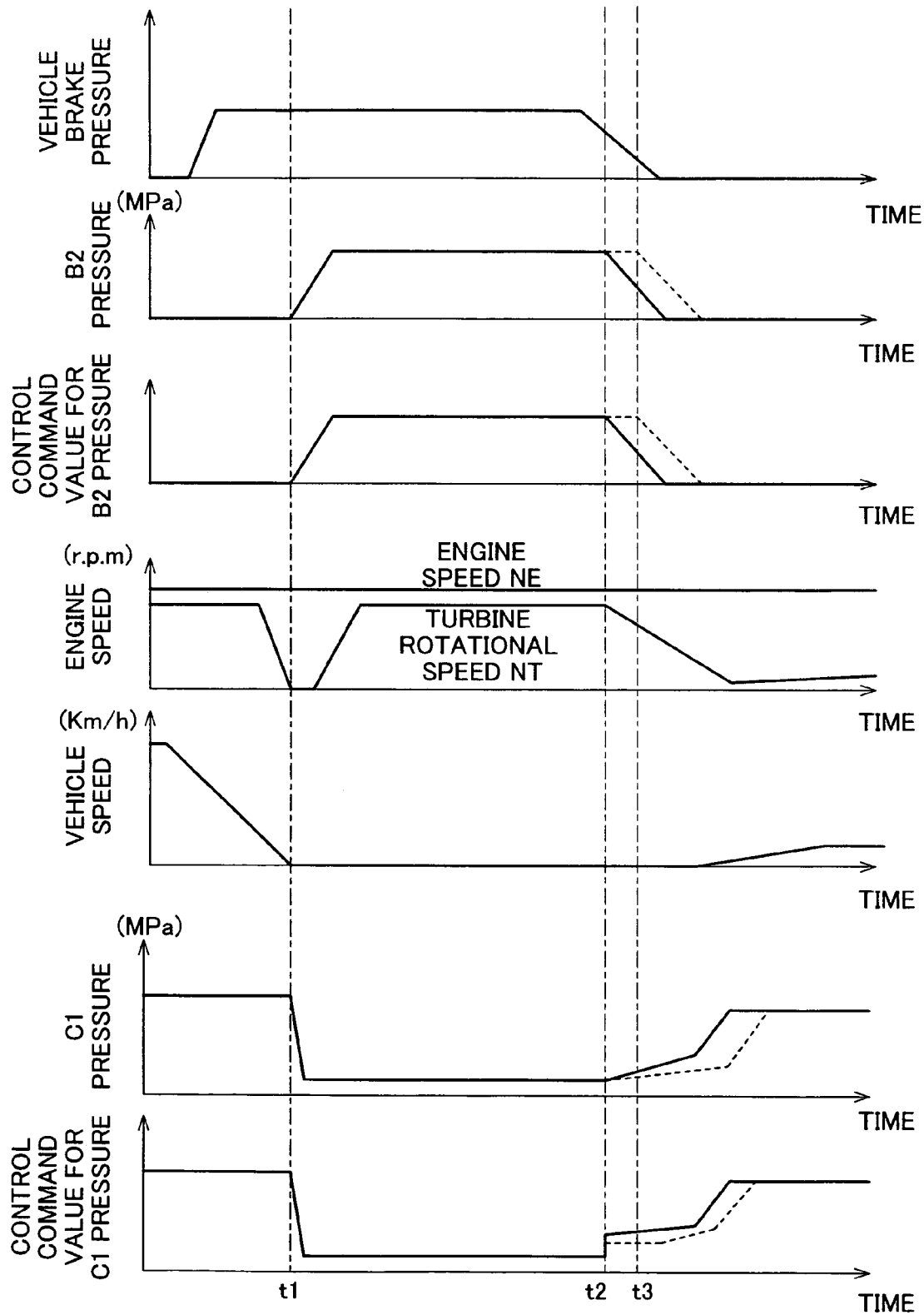
FIG. 11 is a timing chart showing each change in the clutch C1 pressure, brake B2 pressure, and the respective control command values when the neutral control section and the return section are executed as passage of time.

FIG. 11 is a timing chart showing a change in each pressure of the clutch C1, brake B2, and their control command values with respect to the time for each control executed by the neutral control section 140 and the return control section 142 (see flowchart in FIG. 6). FIG. 11 shows an example where the accelerator pedal 50 is not depressed (S8 and S9 are not executed) under the return control.

When the vehicle speed V becomes zero resulting from decelerating operation by operating the foot brake (time point t1), the neutral control starts. That is, the B2 pressure control command value is increased at a predetermined rate, and the C1 pressure control command value is decreased at a predetermined rate. This may increase the actual pressure of the brake B2 and decrease the actual pressure of the clutch C1.

When it is determined that the return condition is established at a time point t2, the neutral control time elapsing from the time point t1 to the time point t2 is calculated. The initial value of the C1 pressure control command value and the timing for starting decrease in the B2 pressure control command value are determined based on the calculated time. Based on the thus determined values, the C1 pressure control command value is increased from the time point t2 in accordance with a predetermined pattern, and the B2 pressure control command value is decreased at a predetermined rate from the time point t3.

Referring to FIG. 11, the solid line represents the case where the neutral control time is relatively short, and the broken line represents the case where the neutral control time is relatively long. When the initial value of the C1 pressure control command value is decreased, the C1 pressure gently rises. Therefore even if the neutral control time becomes long and the torque of the output shaft of the automatic transmission gently decreases, the shock owing to the engagement of the clutch C1 may be reduced. In response to the gentle rise in the C1 pressure, the timing for decreasing the B2 pressure is delayed. This makes it possible to allow the vehicle to take off smoothly.

In the aforementioned embodiment, the return control section 142 serves to decrease the initial value of the C1 pressure control command value as the neutral control time becomes long in order to cope with the change in the torque of the output shaft of the automatic transmission upon rise-up of the engagement pressure of the clutch C1, which varies with the neutral control time. Accordingly, the gentle engagement of the clutch C1 may reduce the shock owing to the return from the neutral state as well as allow the vehicle to smoothly take off.

In the aforementioned embodiment, in the case where the throttle valve 56 is opened, the first increase correction value is set to a larger value as the control time executed by the neutral control section 140 becomes longer in S9. Then the C1 pressure control command value that has been decreased based on the decrease correction value in S4 is increased based on the determined first increase correction value. The decrease correction value is thus partially or entirely offset. In addition the second increase correction value is further set to a larger value as the opening degree θ of the throttle valve becomes large. As the C1 pressure control command value decreased based on the decrease correction value is increased by the determined second increase correction value, the pressure of the clutch C1 rises at an earlier stage. The timing at which the engagement of the clutch C1 completes is advanced in response to the sharp increase in the engine torque.

In the aforementioned embodiment, the timing for starting decrease in the B2 pressure control command value is delayed by the return control section 142 as the neutral control time becomes longer. Even if the pressure of the clutch C1 is gently increased as the neutral control time becomes long, the correlation between the timing for disengaging the brake B2 and the timing for completion of engaging the clutch C1 can be appropriately maintained. This makes it possible to allow the vehicle to smoothly take off.

As has been described with respect to the embodiment of the invention in detail referring to the drawings, it is to be understood that the invention may be formed into various embodiments.

For example, S10 of the flowchart in FIG. 6 may be replaced by the process for determining as to completion of the neutral return control based on the determination whether the turbine rotational speed NT is smaller than a predetermined low synchronous rotational speed that is substantially close to zero, or the determination that the speed ratio of the product of the rotational speed Nout of the output shaft and the gear ratio ? of the automatic transmission 16 (=Nout×?) with respect to the turbine rotational speed NT becomes substantially 1.

The clutch C1 may be completely disengaged instead of being brought into a half-engaged state under the neutral control.

It is to be understood that the aforementioned description is only an example of the invention, and it may be modified or improved so long as it does not depart from the spirit and scope of the invention.

What is claimed is:

1. A control apparatus for an automatic transmission in a vehicle having an engine for providing power to the vehicle via the automatic transmission and having a hill-holding engagement element that prevents the vehicle from moving backward by inhibiting a counter rotation of an output shaft of the automatic transmission when the vehicle is stopped in a state where a forward range of the automatic transmission is selected, comprising:

a neutral control unit that decreases an engagement pressure of a neutral control clutch provided in the automatic transmission and serving to control a connection between the automatic transmission and the engine of the vehicle, and engages the hill-holding engagement element; and a return control unit that engages the neutral control clutch by changing a hydraulic command value for the neutral control clutch based on a predetermined pattern, and disengages the hill-holding engagement element by changing a hydraulic command value for the hill-holding engagement element based on a predetermined pattern when a predetermined neutral return control condition is established, wherein the return control unit changes an engagement control for the neutral control clutch in accordance with a length of time of a control executed by the neutral control unit.

2. The control apparatus according to claim 1, wherein the return control unit is adapted to change a start timing for changing the hydraulic command value of the hill-holding engagement element in accordance with the length of time of the control executed by the neutral control unit.

3. The control apparatus according to claim 1, wherein the return control unit is adapted to determine a decrease correction value of the engagement pressure of the neutral control clutch using a predetermined relation in which the decrease correction value is increased as the length of time of the control executed by the neutral control unit becomes longer, and decreases the predetermined hydraulic command value for the neutral control clutch, based on the determined decrease correction value, such that the neutral control clutch is more gently engaged.

4. The control apparatus according to claim 3, wherein the return control unit is adapted to change a start timing for changing the hydraulic command value of the hill-holding engagement element in accordance with the length of time of the control executed by the neutral control unit.

5. The control apparatus according to claim 3, wherein in an opening state of the throttle valve, the return control unit is adapted to determine a first increase correction value using a predetermined relation in which the first increase correction value is increased as the length of time of control executed by the neutral control unit becomes longer, and further corrects the hydraulic command value of the neutral control clutch that has been corrected with the decrease correction value based on the determined first increase correction value.

6. The control apparatus according to claim 5, wherein the return control unit is adapted to change a start timing for changing the hydraulic command value of the hill-holding engagement element in accordance with the length of time of the control executed by the neutral control unit.

7. The control apparatus according to claim 5, wherein a second increase correction value is determined with a predetermined relation in which the second increase correction value is increased as an opening degree of the throttle valve becomes larger, and the hydraulic command value for the neutral control clutch that has been corrected with the decrease correction value is further corrected based on the determined second increase correction value and the first increase correction value.

8. The control apparatus according to claim 7, wherein the return control unit is adapted to change a start timing for changing the hydraulic command value of the hill-holding engagement element in accordance with the length of time of the control executed by the neutral control unit.

9. A control method for an automatic transmission in a vehicle having an engine for providing power to the vehicle via the automatic transmission and having a hill-holding engagement element that prevents the vehicle from moving backward by inhibiting a counter rotation of an output shaft of the automatic transmission when the vehicle is stopped in a state where a forward range of the automatic transmission is selected, comprising the steps of:

performing a neutral control that decreases an engagement pressure of a neutral control clutch provided in the automatic transmission and serving to control a connection between the automatic transmission and an engine of a vehicle, and engages the hill-holding engagement element; and performing a return control that engages the neutral control clutch by changing a hydraulic command value for the neutral control clutch based on a predetermined pattern, and disengages the hill-holding engagement element by changing a hydraulic command value for the hill-holding engagement element based on a predetermined pattern when a predetermined neutral return control condition is established, wherein an engagement control for the neutral control clutch is changed in accordance with a length of time of a control executed by the neutral control unit.

10. The control method according to claim 9, wherein a start timing for changing the hydraulic command value of the hill-holding engagement element is changed in accordance with the length of time of the control executed by the neutral control unit.

11. The control method according to claim 9, wherein a decrease correction value of the engagement pressure of the neutral control clutch is determined using a predetermined relation in which the decrease correction value is increased as the length of time of the control executed by the neutral control unit becomes longer, and decreases the predetermined hydraulic command value for the neutral control clutch, based on the determined decrease correction value such that the neutral control clutch is more gently engaged.

12. The control method according to claim 11, wherein a start timing for changing the hydraulic command value of the hill-holding engagement element is changed in accordance with the length of time of the control executed by the neutral control unit.

13. The control method according to claim 11, wherein in an opening state of the throttle valve, a first increase correction value is determined using a predetermined relation in which the first increase correction value is increased as the length of time of control executed by the neutral control unit becomes longer, and further corrects the hydraulic command value of the neutral control clutch that has been corrected with the decrease correction value based on the determined first increase correction value.

14. The control method according to claim 13, wherein a start timing for changing the hydraulic command value of the hill-holding engagement element is changed in accordance with the length of time of the control executed by the neutral control unit.

15. The control method according to claim 13, wherein a second increase correction value is determined with a predetermined relation in which the second increase correction value is increased as an opening degree of the throttle valve becomes larger, and the hydraulic command value for the neutral control clutch that has been corrected with the decrease correction value is further corrected based on the determined second increase correction value and the first increase correction value.

16. The control method according to claim 15, wherein a start timing for changing the hydraulic command value of the hill-holding engagement element is changed in accordance with the length of time of the control executed by the neutral control unit.

* * * * *